April 14, 1931.  N. C. SIMONSEN  1,800,572
MOUNTING FOR OIL GAUGES AND THE LIKE
Filed Oct. 15, 1928
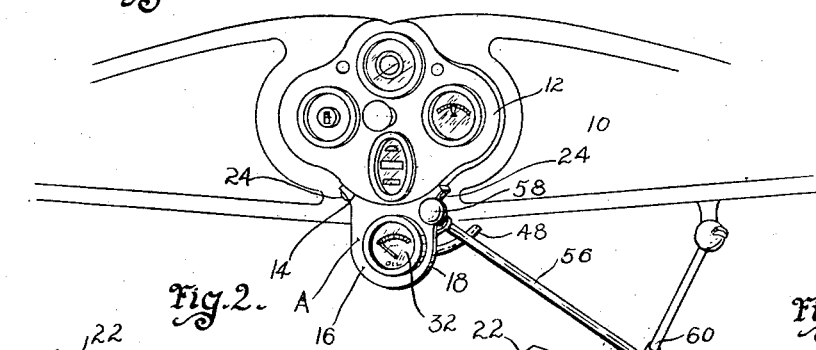
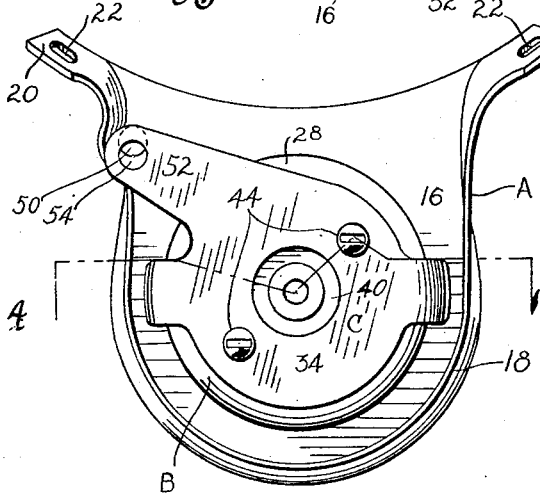
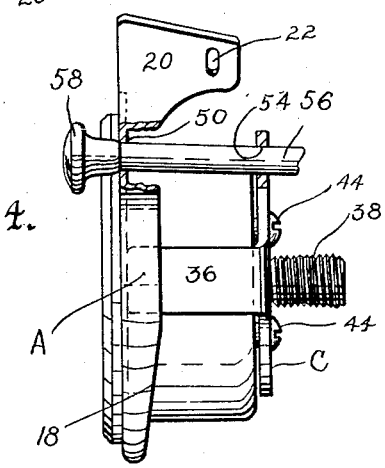
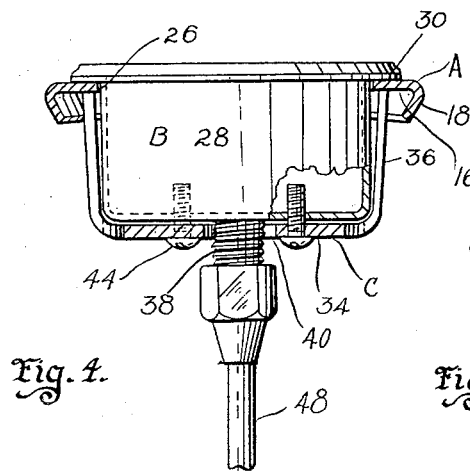
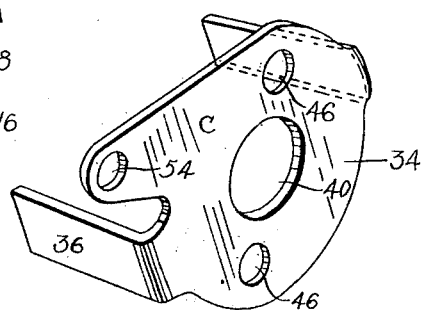
Inventor
Niels C. Simonsen
by Bair, Freeman & Sinclair
Attorneys
Witness
Orval Floden Patented Apr. 14, 1931

1,800,572

UNITED STATES PATENT OFFICE

NIELS C. SIMONSEN, OF SIOUX RAPIDS, IOWA, ASSIGNOR TO SIMONSEN IRON WORKS, OF SIOUX RAPIDS, IOWA, A COPARTNERSHIP COMPOSED OF NIELS C. SIMONSEN AND F. M. INGRAM

MOUNTING FOR OIL GAUGES AND THE LIKE

Application filed October 15, 1928. Serial No. 312,572.

The object of my invention is to provide a mounting of simple, durable and inexpensive construction for oil gauges and the like.

More particularly, it is my object to provide such a mounting which can be installed conveniently and easily as an attachment for supporting an oil gauge and for supporting an actuating rod of the kind used for instance for controlling the choker valve of an automobile in such manner that the mounting affords spaced bearings for the rod and the rod functions to hold the oil gauge carried by the mounting in proper position.

With these and other objects in view, my invention consists in the construction, arrangement and combination of the various parts of my mounting for oil gauges and the like, whereby the objects contemplated are attained, as hereinafter more fully set forth, pointed out in my claims, and illustrated in the accompanying drawings, in which:

Figure 1 is a perspective view of a portion of an instrument board having installed thereon a mounting of the kind embodying my invention.

Figure 2 is a rear elevation of the mounting.

Figure 3 is a side elevation of the same, parts being broken away and parts being shown in section.

Figure 4 is a detail, sectional view taken on the line 4—4 of Figure 2; and

Figure 5 is a perspective view of the retainer forming a part of the mounting.

My improved mounting may be used in a variety of environments but is peculiarly adapted to be used as an attachment on a certain car now being sold. The fact that this car and some others are not provided with an oil gauge on the dash has given rise to a demand in the trade for a dash oil gauge attachment.

I have therefore shown and will described my mounting as arranged for installation on a car of the kind mentioned.

In Figure 1, I have indicated by the reference numeral 10 an instrument board upon which is a raised bracket or plate 12 which supports various instruments.

The lower surface of the bracket 12 is curved as at 14.

My improved mounting includes a bracket member A, comprising a plate 16, the lower part of which is semi-circular in outline as shown in Figures 1 and 2.

At the sides and lower edge of the plate, the metal thereof is bent rearwardly and then inwardly slightly as indicated at 18 forming a curved flange.

At the upper part of the plate at each side thereof, this flange 18 is extended upwardly and laterally to form engaging flanges 20 to fit the under surface of the bracket 12. The flanges 20 are provided with slightly elongated holes 22 to receive screws 24 by which the bracket A is mounted on the bracket 12.

The plate 16 of the bracket A has an annular hole 26 to receive the oil gauge. The oil gauge which in itself forms no part of my present invention is indicated generally at B and is received in a casing 28 having at its front a peripheral flange 30 of greater total diameter than the total diameter of the casing 28. The casing 28 snugly fits the hole 26 and the oil gauge is slipped into the bracket A from the front, so that the flange 30 rests against the front face of the plate 16 of the bracket A with the casing 28 projecting rearwardly as clearly shown for instance in Figure 4.

The oil gauge has the usual dial 32 which should be maintained in upright position.

It will be seen that some means is necessary for securing gauge to the bracket A forming a part of my mounting, and for this purpose, I provide what may be called a retainer C.

The retainer C comprises a plate member 34, which in a general way is round and has at opposite sides legs 36 bent almost at right angles to the plate 34.

The oil gauge B has a rearwardly projecting threaded tube 38 and the plate 34 is provided with a central hole 40 to receive this tube 38.

The retainer C is placed against the back of the oil gauge with the tube 38 projecting through the hole 40 and with the legs 36 bearing against the back of the plate 16. (Figure 4).

The parts are of such size that when the plate 34 is gripped across or pulled toward the back of the oil gauge, the legs 36 will engage the back of the plate 16 of the bracket A.

The retainer C may be gripped in this way in any suitable fashion. For example, I have shown screws 44 extended through suitable holes 46 in the plate 34 of the retainer C. These screws are screwed into the oil gauge at the back thereof.

There is some resiliency in the retainer C and the parts are so arranged that when these screws are tightened or when the plate 34 is otherwise secured to the back of the oil gauge, the plate 16 will be gripped by the flange 30 of the oil gauge and the legs 36 of the retainer C.

There is thus afforded a convenient and simple means for mounting the oil gauge. The tube 38 connects with the usual piping or tubing 48.

It will be seen from the foregoing that there is thus provided a mounting for the oil gauge. My mounting, however, serves an additional function.

In the plate 16 of the bracket A in the upper part thereof near one side of the plate is a hole 50. The plate 34 of the retainer C has a laterally projecting arm 52 at its upper portion provided with a hole 54. I then use the plates 16 and 34 with the holes 50 and 54 for affording spaced bearings, in which there is slidably mounted a choker control rod 56, having on its upper end the button 58.

The other end of the choker rod 56 is connected with an operating member 60 so that by the manipulation of the rod 56, the member 60 may be moved.

Thus the plates 16 and 34 furnish spaced bearings for the rod 56. The holes 54 and 50 are large enough to allow free sliding play of the rod 56.

The retainer C therefore serves not only the function of frictionally gripping the casing of the oil gauge to the bracket A, but also as a means for journaling or supporting the rod 56 at a point sufficiently spaced from the bracket A to afford a proper mounting for the rod.

Ordinarily the retainer C will hold the oil gauge casing by frictional engagement against any rotary movement which might cause the dial of the oil gauge to be out of proper position. It will be noted, however, that since the rod 56 is journaled in the plate 16 and is also connected to the member 60, the fact that the rod 56 extends through the arm 52 causes the rod to function to hold the retainer C and consequently the oil gauge against accidental rotation with relation to the bracket A.

My mounting therefore serves as a combination structure for adequately and properly supporting the oil gauge on the bracket 12 and for properly supporting the auxiliary control rod 56.

I claim as my invention:

1. In a mounting of the class described, a bracket having a plate-like portion with an annular opening therein and having engaging flanges projecting upwardly and laterally, means for mounting said flanges on a support, a casing projected through the opening in the bracket plate having a flange bearing against the front of said plate, a resilient retainer comprising a plate-like member secured to the back of said casing and having legs projecting alongside the casing and engaging the back of the said bracket for thus frictionally gripping the casing to the bracket, a projecting arm on said retainer, said bracket and said arm having openings for receiving slidably an operating rod, whereby when said rod is connected at one end with a supporting member it is afforded spaced bearings between the bracket and the arm on the retainer and serves to hold the retainer against rotary movement.

2. A mounting of the class described, comprising a bracket having an opening therein adapted to receive a casing of the type provided with a flange for bearing against one face of the bracket, and a resilient retainer having a member adapted to be secured to such casing and having legs projecting away from said member for engaging the other face of said bracket for thus gripping the casing to the bracket, said retainer and bracket having spaced holes to receive a slidable rod for furnishing spaced bearings therefor, whereby when said rod is connected with some additional member it serves to prevent rotation of the retainer and casing with relation to the bracket.

3. A mounting of the class described, comprising a bracket having an opening therein adapted to receive a casing of the type provided with a flange for bearing against one face of the bracket, and a resilient retainer having a member adapted to be secured to such casing and having legs projecting away from said member for engaging the other face of said bracket for thus gripping the casing to the bracket, said retainer and bracket having spaced holes to receive a slidable rod for furnishing spaced bearings therefor, whereby when said rod is connected with some additional member it serves to prevent rotation of the retainer and casing with relation to the bracket, said bracket having at its upper portions upwardly and laterally projecting spaced fastening flanges.

4. In a mounting of the class described, a bracket having a plate like portion, a casing supported thereby and having a flange bearing against the front of said plate, means for retaining the casing in supported position, a projecting arm on the back of said casing, said bracket and said arm having openings for slidably receiving an operating rod, whereby when said rod is connected at one end with a supporting member it is afforded spaced bearings between the bracket and the arm on the casing and serves to hold the casing against rotary movement.

5. In a mounting of the class disclosed, a bracket having an opening therein adapted to receive a casing, means for attaching the casing to the bracket, an arm secured to the back of said casing, said arm and bracket having spaced holes to receive a rod and furnishing spaced bearings therefor whereby when said rod is connected with some additional member it serves to prevent rotation of the casing relative to the bracket.

Des Moines, Iowa, October 2, 1928.

NIELS C. SIMONSEN.